United States Patent
Burger et al.

(10) Patent No.: US 10,583,524 B2
(45) Date of Patent: Mar. 10, 2020

(54) LASER PROCESSING HEAD COMPRISING A LENS INTERCHANGE SYSTEM

(71) Applicant: TRUMPF Werkzeugmaschinen GmbH + Co. KG, Ditzingen (DE)

(72) Inventors: Dieter Burger, Vaihingen (DE); Dominik Vees, Tuebingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 544 days.

(21) Appl. No.: 15/353,501

(22) Filed: Nov. 16, 2016

(65) Prior Publication Data

US 2017/0057009 A1  Mar. 2, 2017

Related U.S. Application Data

(63) Continuation of application No. PCT/EP2015/060611, filed on May 13, 2015.

(30) Foreign Application Priority Data

May 16, 2014 (DE) .................. 10 2014 209 308

(51) Int. Cl.
*B23K 26/046* (2014.01)
*B23K 26/06* (2014.01)
(Continued)

(52) U.S. Cl.
CPC ........ *B23K 26/046* (2013.01); *B23K 26/0648* (2013.01); *B23K 26/1462* (2015.10);
(Continued)

(58) Field of Classification Search
CPC .............. B23K 26/046; B23K 26/0648; B23K 26/1462; B23K 26/21; B23K 26/38; B23K 2103/50; B23K 26/0617; B23K 26/0665; B23K 26/40; B23K 26/53; G02B 7/16; G02B 15/06; G02B 27/0955; G02B 7/14; G02B 7/02; H01S 3/005
(Continued)

(56) References Cited

U.S. PATENT DOCUMENTS 5,332,881 A * 7/1994 Topkaya .............. B23K 26/046
                                                   219/121.75
6,226,118 B1   5/2001 Koyama
(Continued)

FOREIGN PATENT DOCUMENTS

CN       1289058     3/2001
CN       102985214   3/2013
(Continued)

OTHER PUBLICATIONS

Yasunobu_JP2007290932_, (Year: 2007).*
(Continued)

*Primary Examiner* — Tu B Hoang
*Assistant Examiner* — Tiffany T Tran
(74) *Attorney, Agent, or Firm* — Fish & Richardson P.C.

(57) ABSTRACT

A laser processing head, by means of which lenses in the beam path of the laser beam may be interchanged for the purposes of changing the beam diameter at the workpiece, wherein the laser processing head may have a structurally simple and compact embodiment.

13 Claims, 6 Drawing Sheets

(51) Int. Cl.
  *B23K 26/38* (2014.01)
  *G02B 27/09* (2006.01)
  *G02B 7/16* (2006.01)
  *B23K 26/21* (2014.01)
  *B23K 26/14* (2014.01)
  *G02B 15/06* (2006.01)

(52) U.S. Cl.
  CPC .............. *B23K 26/21* (2015.10); *B23K 26/38* (2013.01); *G02B 7/16* (2013.01); *G02B 15/06* (2013.01); *G02B 27/0955* (2013.01)

(58) Field of Classification Search
  USPC ....... 359/432, 513, 385, 368, 380, 821, 388; 219/121.75, 64, 67, 85, 63; 353/100, 101
  See application file for complete search history.

(56) References Cited

U.S. PATENT DOCUMENTS

| | | | |
|---|---|---|---|
| 6,437,911 B1 | 8/2002 | Hasegawa | |
| 2001/0008461 A1 | 7/2001 | Koyoma et al. | |
| 2008/0106787 A1* | 5/2008 | Tsutsui | G02B 6/4206 359/385 |
| 2011/0050837 A1* | 3/2011 | Sakurai | B41J 2/471 347/224 |
| 2013/0021663 A1* | 1/2013 | Makara | G02B 21/248 359/385 |
| 2013/0044371 A1* | 2/2013 | Rupp | B23K 26/046 359/432 |
| 2015/0219985 A1* | 8/2015 | Shouji | G03B 21/2013 353/31 |

FOREIGN PATENT DOCUMENTS

| | | | | |
|---|---|---|---|---|
| DE | 19630147 A1 | | 1/1998 | |
| DE | 10215446 A1 | | 11/2003 | |
| EP | 2711121 A1 | * | 3/2014 | ......... B23K 26/0648 |
| JP | 6174794 A | | 4/1986 | |
| JP | 2007290932 A | | 11/2007 | |
| WO | WO2011131541 A1 | | 10/2011 | |

OTHER PUBLICATIONS

TranslatrionYasunobu_JP2007290932_(Year: 2007).*
JPH 1-173716U (Year: 1989).*
Chinese Office Action in Application No. 201580025414.2, dated Nov. 27, 2017 (with English translation).
International Search Report from corresponding PCT Application No. PCT/EP2015/060611, dated Oct. 8, 2016, 6 pages.
Second Examination Report from corresponding German Application No. 10 2014 209 308.2, dated Dec. 23, 2015, 5 pages.

* cited by examiner

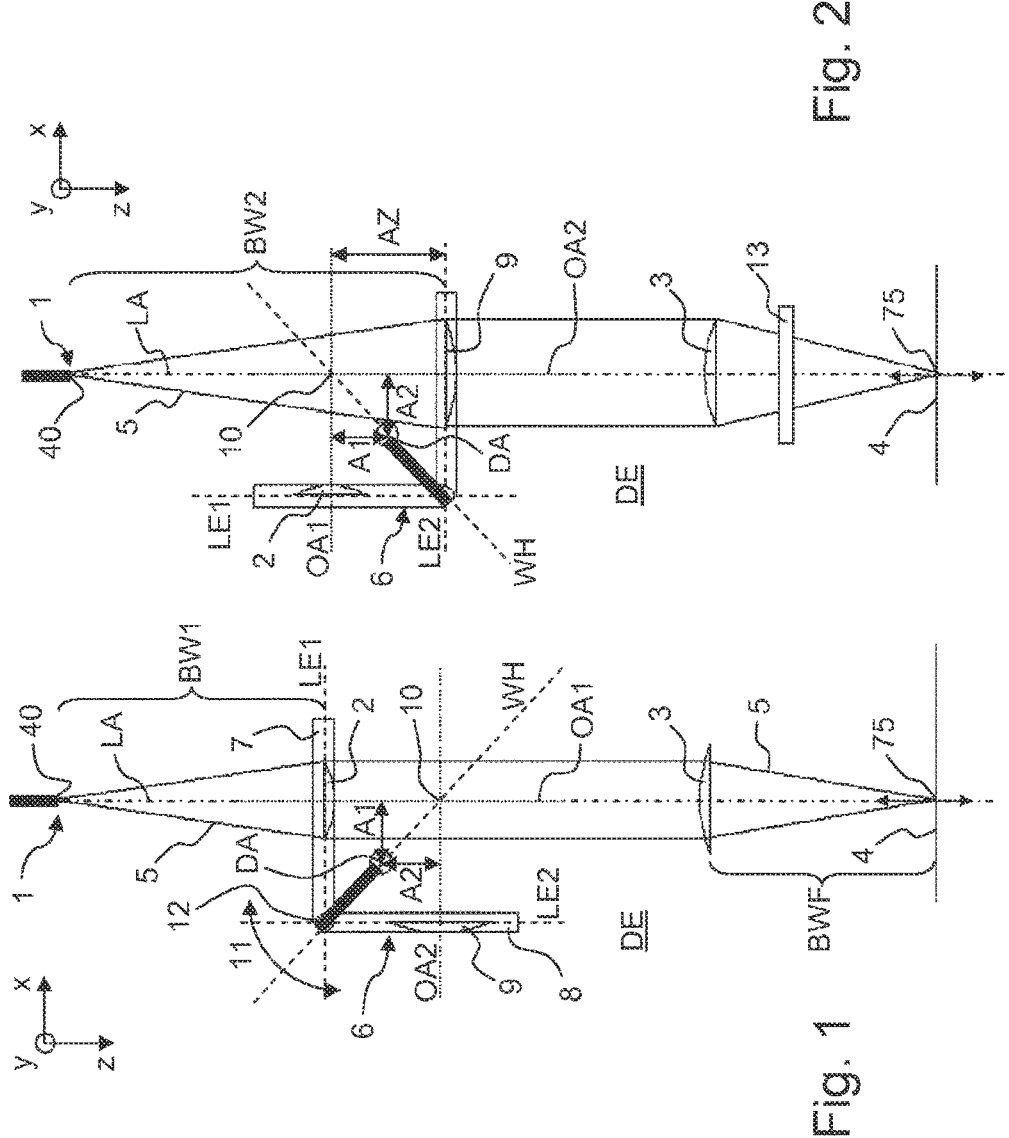

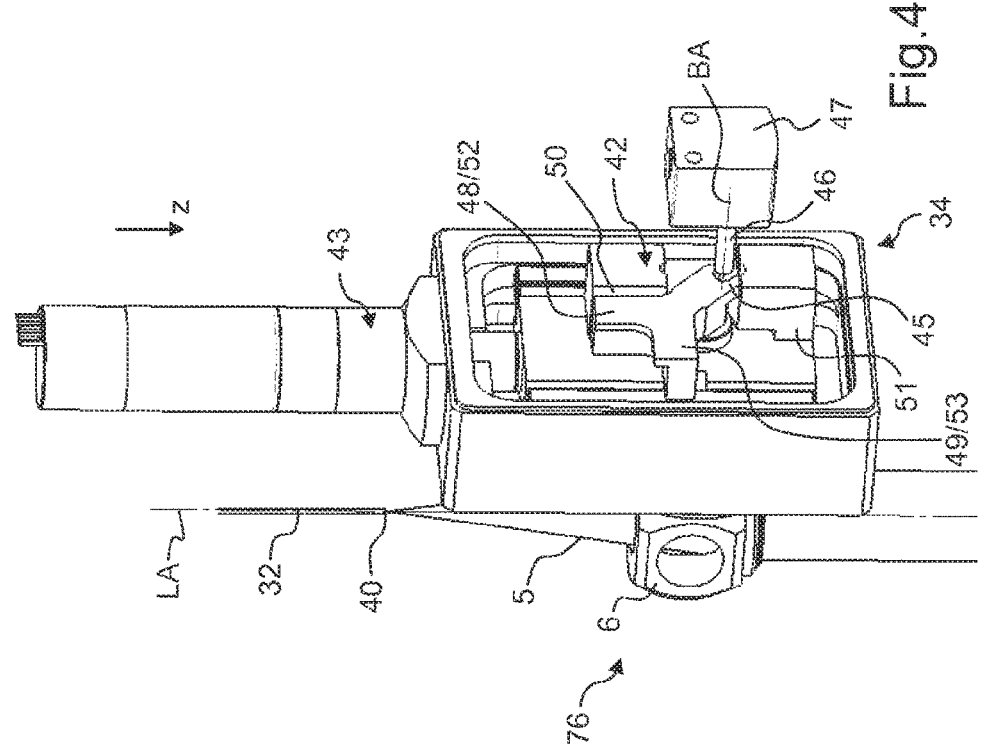
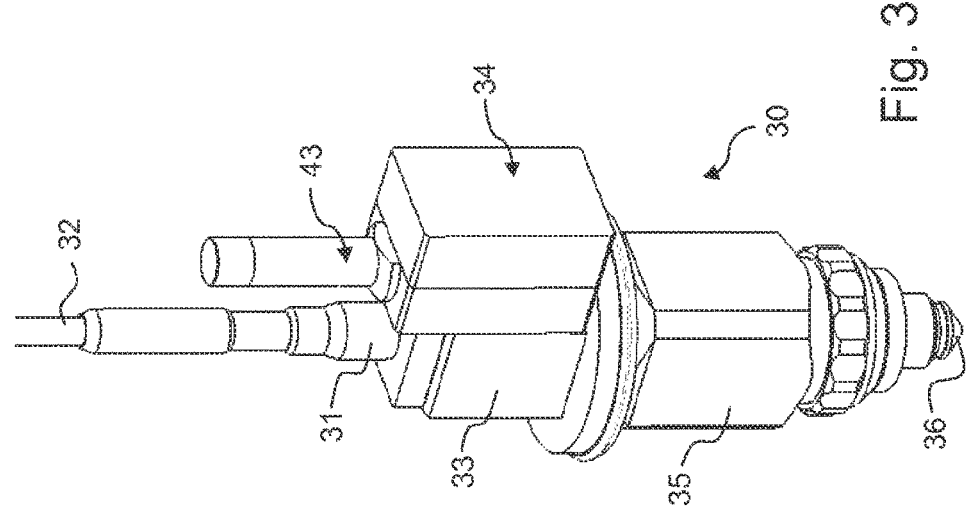

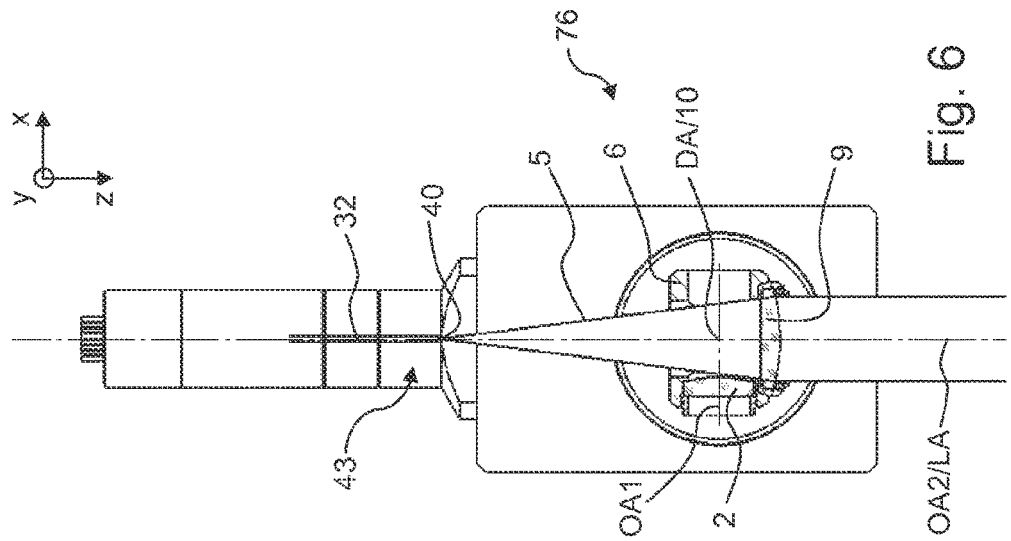
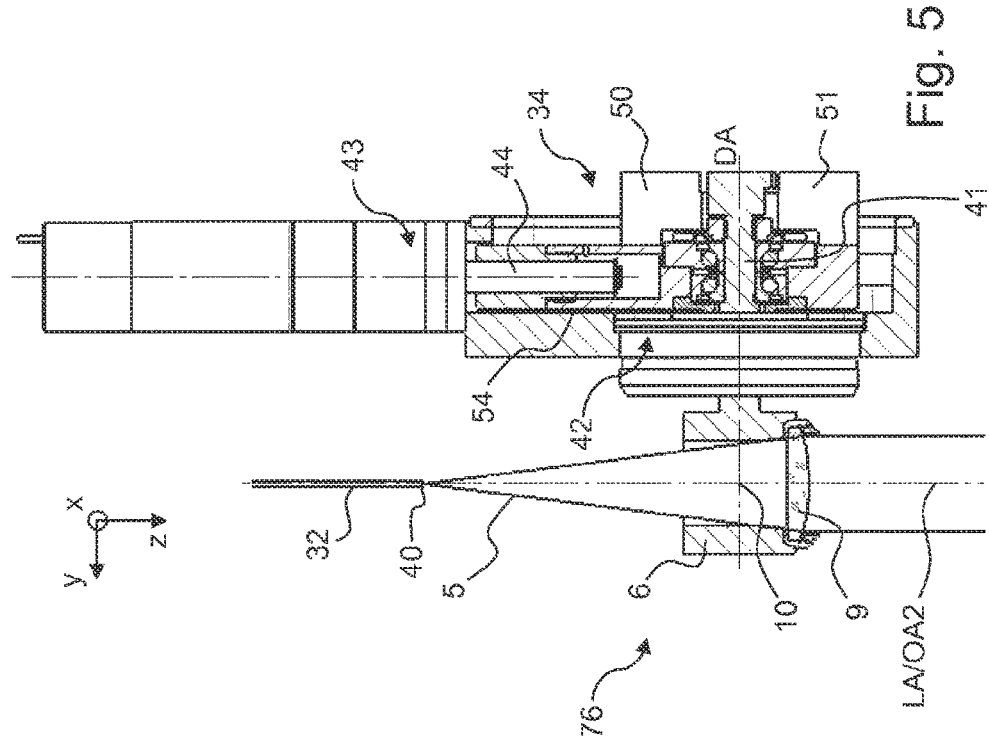

LASER PROCESSING HEAD COMPRISING A LENS INTERCHANGE SYSTEM

CROSS-REFERENCE TO RELATED APPLICATIONS

This application is a continuation of and claims priority under 35 U.S.C. § 120 to PCT Application No. PCT/EP2015/060611 filed on May 13, 2015, which claims priority to German Application No. DE 10 2014 209 308.2, filed on May 16, 2014. The entire contents of these priority applications are incorporated herein by reference.

TECHNICAL FIELD

The invention relates to a laser processing head with a lens interchange system having two selectable lenses with different focal lengths.

BACKGROUND

Workpieces, in particular sheets, may be processed with accuracy by laser processing methods, in particular laser cutting and laser welding. Depending on the processing methods and on the workpiece to be processed, laser processing requires different laser beam diameters at the workpiece in order to optimize the speed of the laser processing and the processing quality. Laser cutting of different material strengths of the workpiece can require different laser beam diameters.

In a laser processing machine including a solid-state laser, the laser beam is guided to a laser processing head by means of an optical fiber. In the laser processing head, the laser beam emerging in a substantially divergent manner from an end of the optical fiber is usually collimated first by way of a collimating lens (or lens group). The collimated laser beam is subsequently focused onto the workpiece to be processed by a convex lens (or lens group). In such a laser processing head, switching between two laser beam diameters can include interchanging the collimating lens (or lens group) or the convex lens (or lens group).

DE 102 15 446 A1 describes a combined laser head for different types of laser processing. In one embodiment, the ends of an approximately z-shaped shaft have a lens arranged at one end and a lens-nozzle module arranged at the other end. The shaft is rotatable about the axis of the middle piece. Furthermore, the shaft may be swiveled about a swivel axis extending perpendicular to the laser beam by means of a swiveling device. The swivel axis can extend perpendicular to the axis of the middle piece. The lens and the lens-nozzle module may be alternately swiveled into the beam path of the laser beam. In another embodiment, a plurality of attachment devices, each with a positive lens, are arranged in a revolver disk. The revolver disk is rotatable about an axis which extends inclined by 45° in relation to the laser beam.

DE 196 30 147 C2 has disclosed a connection head for processing a workpiece by means of a laser beam. In one embodiment, the carriers, which each have a plurality of receptacles for focusing optical units, are rotatable about an axis extending parallel to the laser beam.

The interchange mechanisms can require much installation space on the laser processing head and, in part, have a relatively complex structure.

Furthermore, WO 2011/131541 A1 has disclosed a beam-forming unit for focusing a laser beam, in which the beam diameter is adjustable in a completely variable manner by means of a zoom lens. This beam-forming unit has a particularly complicated structure.

SUMMARY

The invention is based on the object of presenting a laser processing head including lenses configured to interchangeably be in the beam path of a laser beam for modifying the beam diameter at the workpiece, such that the laser processing head can have a structurally simple and compact embodiment.

The laser processing head can be configured to comprise a lens interchange system comprising two lenses with different focal lengths, wherein by means of the lens interchange system one of the lenses can be selected and brought into the beam path of a laser beam in the laser processing head. The lenses may be attached to a common frame, which is swivelable about an axis of rotation. The axis of rotation may extend perpendicular to a laser beam axis of the laser beam. The laser processing head or the lens interchange system, respectively, may be configured such that the optical axes of both lenses cross at a crossing point and the axis of rotation extends perpendicular to a plane of rotation, which contains the optical axes of both lenses. The respective distances of the optical axes of the two lenses from the axis of rotation in the plane of rotation are of equal magnitude. A space-saving, simple, and light structure is possible as a result of the design, according to the configuration of the laser processing head and the lens interchange system thereof, in particular as a result of the geometry of the optical axes and the axis of rotation.

As a result of the rotatable frame, it is possible to interchange the lenses held in the frame. The lenses may be placed substantially around the axis of rotation, which may have a particularly compact configuration, as a result of the optical axes of the lenses crossing. The optical axes have a uniform position along the axis of rotation as a result of the plane of rotation containing the optical axes of the lenses. The distances of the optical axes of the lenses from the axis of rotation (measured perpendicular to the respective optical axis and in the plane of rotation) being of equal magnitude ensures that, after a lens interchange in the beam path of the laser beam, the optical axis of a newly swiveled-in lens does not have a lateral offset in relation to the optical axis of the previously swiveled-in lens.

The design of the laser processing head can ensure that the optical axes of the lenses in the respectively swiveled-in rotational position coincide with the laser beam axis (e.g., the principal axis of the laser processing head), without requiring a readjustment of a lens position on account of a lens interchange.

The laser processing head can include exactly two lenses, which can be sufficient for adapting to different workpiece material strengths, or to different processing methods, without increasing the structural outlay. The laser processing head can include three or even more lenses on the frame, which can be brought into the beam path of the laser beam by the lens interchange system, with the lenses generally being arranged on the frame in such a way that they do not overlap in the beam path of the laser beam.

The rotation of the frame may be actuatable by a motor; the rotation of the frame through a suitable angle causing a lens interchange. The focal diameter (beam diameter) of the laser beam at a workpiece can be switched by interchanging the lenses. The focal diameter can be switched for different processing methods, such as for welding or cutting workpieces, or for cutting workpieces of different thicknesses.

The laser processing head can be configured such that the beam path does not need to be opened up when switching between lenses, thus avoiding damaging the lenses when changing the beam diameter. The laser processing head can be configured to interchange lenses within about 1 second or less than 1 second.

The laser processing head can be configured to include at least one collimating lens, at least one convex lens, a pressure-resistant protective glass in front of the (foremost) convex lens, and a gas emergence nozzle in the beam path of the laser beam. A lens interchange system may be configured to interchange collimating lenses and/or convex lenses. In general, one end of an optical fiber, which in turn is coupled to a laser (i.e., a solid-state laser), acts as a light source.

An embodiment of the laser processing head according to the invention includes an optical configuration, in which the axis of rotation intersects an angle bisector between the optical axes of the two lenses at right angles. The optical configuration permits a compact design, in which the distances of the optical axes of both lenses from the axis of rotation are automatically provided. The axis of rotation intersects the angle bisector at right angles.

In another embodiment of the laser processing system according to the invention, provision is made for the lens planes of the two lenses to intersect in a straight vertex line and for the axis of rotation to be parallel to the straight vertex line and at a distance from the straight vertex line. The axis of rotation may lie between the straight vertex line (or the lens planes or the lens plane, which intersects the angle bisector closest to the crossing point) and the crossing point, or on the crossing point. An offset between the (respectively swiveled-in) lenses may be configured in the direction of the laser beam axis (i.e., z-direction). The space required for switching between the lenses, including the maximum radius of moving parts of the frame can be minimized. The lens plane is the central plane of the lens in the case of thin lenses and the principal plane of the lens that lies closest to the crossing point in the case of thick lenses.

An embodiment, in which the axis of rotation extends through the crossing point, facilitates a compact design of the laser processing head. In some implementations, the axis of rotation can be distant from the crossing point, to obtain a large offset between the respectively swiveled-in lenses in the direction of the laser beam axis (i.e., z-direction).

An embodiment, in which the optical axes of the two lenses intersect at right angles, facilitates a compact construction of two lenses, in which the lenses do not yet shadow one another. For intersecting the optical axes at right angles, the frame can have two limbs arranged at right angles, with the lenses being held by the limbs.

In another embodiment, provision is made for the frame and the axis of rotation to be configured in such a way that the two lenses are swiveled into the beam path of the laser beam at positions offset by a distance AZ in respect of the direction of the laser beam axis (i.e., z-direction). The distance AZ relates to a coordinate system, which assumes the axis of rotation (or the footprint thereof on the plane of rotation) as a reference point. The distance AZ can be used to adapt the laser processing head to the modified lens focal length such that displacements of the lens interchange system in the z-direction may be avoided or shortened. Alternatively, it is also possible to swivel the lenses into the beam path of the laser beam at identical z-positions (i.e. with AZ=0).

In another embodiment, the optical configuration can provide for the distance AZ to correspond to the difference in the focal lengths of the two lenses. The laser processing head can have the same focus after the lens interchange as before, and laser processing of a workpiece may be continued without a delay due to readjustments.

In an embodiment the lens interchange system includes collimating lenses. The interchange system for rotating the frame can be at a relatively large distance from the workpiece, such that the workpiece processing is not impaired. Alternatively, the lenses of the interchange system may be convex lenses.

In some embodiments the swiveled-in position of the lens with the shorter focal length in the direction (z) of the laser beam axis is configured to be closer to a laser light source of the laser processing head than the swiveled-in position of the lens with the longer focal length, facilitating a compact design of the laser processing head. The frame is preferably swiveled in such a way that the lens with the shorter focal length is moved counter to the propagation direction of the laser beam when the lens is swiveled out of the work position and the lens with the longer focal length is moved in the propagation direction of the laser beam when the lens is swiveled out of the work position. If the lens interchange system is embodied with convex lenses, the sequence of the swiveled-in positions of the lenses is reversed. The laser light source can be positioned at the end of an optical fiber.

In an embodiment, the lens interchange system can form two stops for two rotational positions of the frame, in which, in each case, one of the two lenses is swiveled into the beam path of the laser beam. The laser processing head can include fixation means, by which the frame may be fixed in both rotational positions. The lenses may be aligned in relation to the laser beam, and held in the aligned position, very easily by way of the stops and the fixation means. The fixation means may include magnets or springs. The stops can have an adjustable embodiment in order to simplify the initial adjustment.

In an embodiment, the laser processing head is embodied in such a way, or the focal lengths of the lenses of the laser processing head are selected in such a way, that a laser light source of the laser processing head is projected in a magnified manner. The laser light source may be the end face of an optical fiber. The laser light source can be projected onto a workpiece to be processed, for example a metal sheet. The optical configuration can facilitate a compact design if the frame is displaced along the laser beam axis for the purposes of adjusting the focal position. In the case of magnified imaging, a z-direction displacement of the frame or of a lens in the beam path is translated into a z-direction displacement of the focal point, which is increased with the square of the scale ratio.

In another embodiment, the frame is arranged on a carriage, in relation to which the frame is mounted in a manner rotatable about the axis of rotation, wherein the carriage is displaceable in a motor-driven manner in the direction of the laser beam axis. The position of the lenses of the frame in z-direction may be adjusted in relation to other lenses of the laser processing head and/or in relation to the laser light source (for example the end of an optical fiber) by means of the carriage; as a result, the focal position at the workpiece (for example a sheet) may be set. The displacement of the focal position in the z-direction also influences the focal diameter. The design of the optical system of the laser processing head, such as the focal lengths of the installed lenses, the lens distance and the (maximum) travel of lenses or the displacement range of the frame in the z-direction may be selected in such a way that a change in the focal diameter is at most approximately 10% and is correspondingly tolerable.

In another embodiment, a fork or a slot for engagement with a bolt, which is not displaceable with the carriage, is embodied or fastened to the frame. The motor system of the carriage may also be used for rotating the frame in a simple manner. Carriage displacement can include a mixture of a rotation of the frame about the bolt and a movement of the bolt along the fork or the slot; the former also causes a rotation of the frame about the axis of rotation. The bolt can engage on the frame (or on an attachment part of the frame) at a radial distance from the axis of rotation and the bolt can be aligned parallel to the axis of rotation and has a round cross-section. Alternatively, provision may be made of a dedicated motor for actuating the rotational movement of the frame.

In some embodiments, in relation to the direction of the laser beam axis (z-direction), a possible distance AZ between the positions of the lenses swiveled into the beam path of the laser beam, plus an associated travel of the carriage for swiveling the frame by means of the fork or the slot, corresponds to the difference of the focal lengths of the two lenses. In other words, the positional change of the lenses as a result of a lens interchange on the carriage, plus the travel of the carriage as a result of a lens interchange, compensates the difference in the focal lengths of the lenses exchanged for one another. The focal position at the workpiece does not change during the lens interchange. The laser processing may be continued after the lens interchange without a delay due to a readjustment.

In some embodiments, it can be advantageous if the bolt can be embodied such that it may be inserted into, or retracted from, the fork or the slot in a motor-driven manner, in particular by means of a short-stroke cylinder. The bolt can be displaced parallel to the direction of the axis of rotation. The bolt may be made to engage with the fork or the slot in a selective manner for the lens interchange and the carriage may otherwise be displaced for adjusting the focal position without affecting the rotational position of the frame.

In some embodiments, the frame of the lens interchange system includes three or more lenses, such that the optical axes of all lenses of the frame extend in a common plane of rotation. The respective distances of the optical axes of all lenses of the frame from the axis of rotation in the common plane of rotation can be of equal magnitude. The three lenses (or else even more lenses in an analogous fashion) attached to the frame can be alternatively introduced into the beam path in a simple and compact manner. The respectively swiveled-in lens requires no readjustment in the direction along the axis of rotation and across the laser beam axis. The optical axes of the at least three lenses of the frame cross in a pairwise manner or the optical axes of all lenses of the frame intersect at a common crossing point.

In an embodiment the optical axes of all lenses of the frame intersect at a common crossing point and the axis of rotation extends through the common crossing point. The distances of the optical axes from the axis of rotation are inherently configured to be substantially equal in a simple and compact arrangement.

Further advantages of the invention emerge from the description and the drawings. Likewise, the features mentioned above and the features yet to be explained below may, according to the invention, find use in each case by themselves or as a plurality in arbitrary combinations. The embodiments as shown and described should not be understood to be an exhaustive list, but rather are of exemplary character for describing the invention. The invention is depicted in the drawing and explained in more detail on the basis of exemplary embodiments.

DESCRIPTION OF DRAWINGS

FIG. 1 shows a schematic overview of the optical system of a laser processing head according to the invention comprising two lenses, with a lens with a short focal length being swiveled into the beam path of the laser beam;

FIG. 2 shows the optical system of FIG. 1, with a lens with a long focal length being swiveled into the beam path of the laser beam;

FIG. 3 shows a schematic perspective outside view of an embodiment of a laser processing head according to the invention;

FIG. 4 shows the laser processing head of FIG. 3 in a schematic perspective view in the region of the lens interchange system for the collimation lens, with a partly removed housing;

FIG. 5 shows a schematic cross-sectional illustration of the lens interchange system of FIG. 4, but without a short-stroke cylinder;

FIG. 6 shows a schematic plan view of the lens interchange system of FIG. 4;

DETAILED DESCRIPTION

Figure 7:
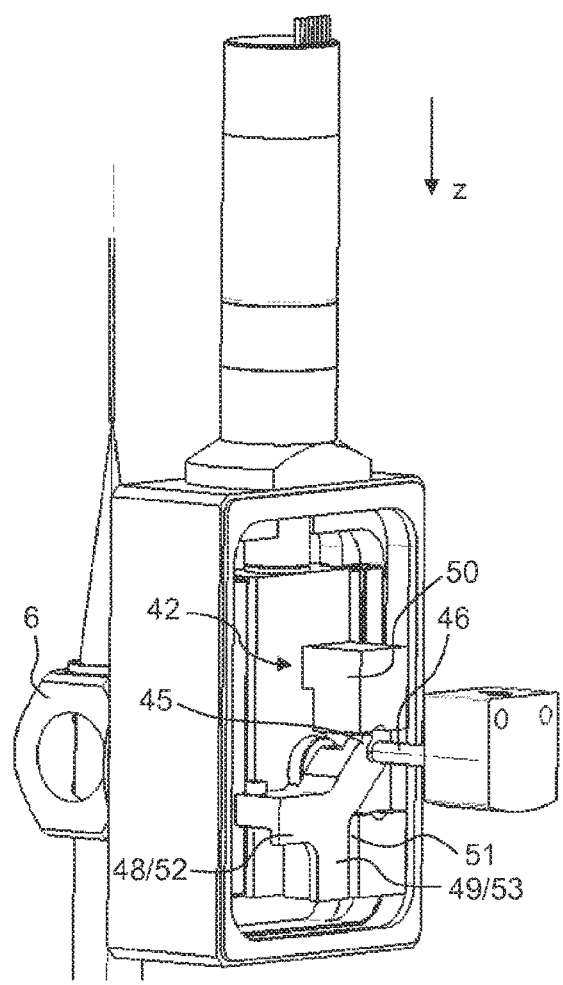
FIG. 7 shows the laser processing head of FIG. 4 in a schematic perspective view, with a fork rotated by 90° in relation to FIG. 4.

In a schematic illustration, FIG. 1 shows a plurality of components of the optical system of a laser processing head. By means of a collimating lens 2 and a convex lens 3, the laser processing head images a laser light source 1, in this case the end face of the optical fiber, onto the surface (or else onto a plane just below the surface) of a workpiece 4. A laser beam 5 exits the end 40 of the optical fiber as a divergent beam, which is collimated (parallelized) by means of the collimating lens 2. The end 40 of the optical fiber is arranged at a distance from the collimating lens 2 (or the lens plane LE1 thereof), which corresponds to the focal length BW1 of the collimating lens 2. The collimated laser beam 5 is focused by the convex lens 3. The workpiece 4 is arranged in front of the convex lens 3 in accordance with the focal length BWF of the convex lens 3.

In the laser processing head, the laser beam 5 propagates along a laser beam axis LA, which extends in the vertical direction (z-direction), from top to bottom, in this case. The optical axis OA1 of the collimating lens 2 (depicted by dots) coincides with the laser beam axis LA. The optical axis of the convex lens 3 (not specifically marked) also coincides with the laser beam axis LA.

The frame 6 is swivelable about an axis of rotation DA to modify the focal size of the laser beam 5 on the workpiece 4. The axis of rotation DA extends perpendicular to the laser beam axis LA, illustrated as being perpendicular to the plane of the drawing of FIG. 1. The frame 6 includes two limbs 7 and 8 arranged at right angles to one another, with the collimating lens 2 being arranged in the limb 7. A second collimating lens 9, which has a longer focal length than the collimating lens 2 (in this respect, see FIG. 2 below), is arranged in the limb 8.

The optical axis OA1 of the collimating lens 2 and the optical axis OA2 of the collimating lens 9 intersect at a crossing point 10, in this case at right angles. Accordingly, the lens plane LE2 of the collimating lens 9 is also perpendicular to the lens plane LE1 of the collimating lens 2. Both optical axes OA1, OA2 extend perpendicular to the axis of rotation DA and, as a result thereof, define a plane of rotation DE, which lies in the plane of the drawing in FIG. 1.

The axis of rotation DA further lies on the angle bisector WH between the optical axes OA1, OA2. The distances A1, A2 of the optical axes OA1, OA2 from the axis of rotation DA, in each case measured perpendicular to the respective optical axis OA1, OA2, are substantially equal. In the shown embodiment, the axis of rotation DA lies between the crossing point 10 and the straight vertex line 12, at which the lens planes LE1, LE2 intersect.

In order to change now from the collimating lens 2 to the collimating lens 9 with the longer focal length, the frame 6 is swiveled about the axis of rotation DA, in this case through 90°, in the direction of the arrow 11 (counterclockwise). As a result, the collimating lens 2 is swiveled out of the beam path of the laser beam 5 counter to the beam propagation direction and the collimating lens 9 is swiveled into the beam path of the laser beam 5 counter to the beam propagation direction.

FIG. 2 shows the swiveled rotational position of the frame 6. The collimating lens 9 is arranged in the beam path of the laser beam 5, with the optical axis OA2 of the collimating lens 9 now coinciding with the laser beam axis LA. The collimating lens 9 is arranged offset in the z-direction by a distance AZ in relation to the collimating lens 2 of FIG. 1. The laser light source 1 (e.g., the end 40 of the optical fiber) is arranged in front of the collimating lens 9 at a distance corresponding to the focal length BW2 of the collimating lens in order to collimate the laser beam 5. The frame 6 and the position of the axis of rotation DA are selected in such a way that the difference in focal lengths BW2-BW1 equals the distance AZ.

Since the distance A2 of the optical axis OA2 from the axis of rotation DA equals the distance A1 of the optical axis OA1 from the axis of rotation DA, the optical axis OA2 of the collimating lens 9 is correctly aligned in the x-direction after rotation of the frame 6. Both optical axes OA1, OA2 extend in the same plane of rotation DE perpendicular to the axis of rotation DA, enabling a correct position of the optical axis OA2 in the y-direction.

In some implementations, in order to protect the convex lens 3 from being damaged during the laser processing of the workpiece 4, a pressure-resistant protective glass 13 is arranged in front of the convex lens 3. The beam path of the laser beam 5 between the laser light source 1 and the protective glass 13 can be enclosed by a housing (not depicted here), firstly to avoid damaging the optical system but also to protect operating staff in the surroundings from the laser light.

In order to be able to adjust the z-position of the laser beam 5, or the z-position of the focal spot 75 thereof, in relation to the workpiece 4, frame 6 has a displaceable embodiment in the z-direction such that the position of (swiveled-in) lenses 2, 9 may be modified in the z-direction in relation to the laser light source 1 and the convex lens 3. The frame 6 can be mounted, in a manner rotatable about the axis of rotation DA thereof, on a carriage (not depicted here, but cf. FIGS. 3-7 in this respect) and the carriage is displaceable together with the frame 6 in the z-direction.

FIG. 3 shows a laser processing head 30 according to the invention in a schematic outside view. The laser processing head includes a connection piece 31 for an optical fiber 32, in which one end of the optical fiber 32, from which a divergent laser beam emerges (covered in FIG. 3), is arranged.

The laser processing head 30 includes an upper housing part 33, in which the frame of a lens interchange system, on which two collimating lenses are held, is housed. The laser beam propagating in the upper housing part 33 is collimated by the collimating lens situated in the beam path (once again covered in FIG. 3). A motor system 34 is arranged on this upper housing part 33, by means of which motor system the frame may be rotated and displaced in the upper housing part 33.

The laser processing head 30 includes a lower housing part 35, in which a convex lens, which focuses the laser beam propagating in the lower housing part 35 is housed (once again covered in FIG. 3). A nozzle 36 is attached to the lower end of the lower housing part 35, by means of which the region on the workpiece processed by the laser beam may be exposed to a gas flow, for example a cutting gas flow for driving the melt out of the cutting gap and/or an inert gas flow in order to prevent oxidations on the workpiece.

It should be noted that, in the laser processing head 30 according to the invention, the beam path of the laser beam is completely surrounded up to the nozzle 36. The beam path (in particular the housings 33, 35) does not need to be opened for rotating or displacing the frame in the upper housing part 33 (i.e. for interchanging or adjusting the collimating lenses).

FIGS. 4, 5, and 6 illustrate the region of the upper housing part 33 and of the motor system 34 of the laser processing head 30 from FIG. 3 in more detail, with some covers having been removed for an improved understanding. The motor system 34 together with the lens-carrying frame 6 may be referred to as a lens interchange system 76.

The laser beam 5 emerging at an end 40 of the optical fiber 32 passes through a frame 6, approximately cubical in this case, with the laser beam 5 being collimated by a collimating lens 9 with a long focal length at the lower side of the frame 6 in the rotational position of the frame 6 shown in FIGS. 5 and 6. The frame 6 further holds a collimating lens 2 with a short focal length, cf. FIG. 6. By rotating the frame 6 about the axis of rotation DA thereof, it is possible to interchange the collimating lenses 9, 2 in the beam path of the laser beam 5. In particular, proceeding from the rotational position in FIG. 6, the collimating lens 2 may be brought into the laser beam 5 by rotating the frame 6 clockwise through 90° such that the lens is then arranged on the top side of the frame 6 (the latter is not depicted here; however, cf. FIG. 7 in relation to the rotated position). In the shown embodiment, the axis of rotation DA extends through the crossing point 10 of the optical axes OA1, OA2 of the collimating lenses 2, 9, which intersect at the crossing point 10 at an angle of 90°.

The frame 6 is rigidly connected to a swivel shaft 41, which is mounted without play on a carriage 42 in a manner rotatable about the axis DA. The carriage 42 is displaceable linearly, parallel to the laser beam axis LA (i.e. in the z-direction), by means of a motor 43 which drives a ball screw 44 and, for this purpose, the carriage is mounted without play on at least one rail 54 of the laser processing head.

In the shown embodiment, the motor 43 which drives the carriage 42 may also perform a rotation of the frame 6. To this end, a fork 45 is arranged at the rear end of the swivel shaft 41, with a bolt 46 of a short-stroke cylinder 47 being able to engage into the fork (only depicted in FIG. 4). The fork 45 and the bolt 46 are radially spaced apart from the axis of rotation DA. By way of the short-stroke cylinder 47, the bolt 46 may be inserted into the fork 45, and retracted from the fork 45 again, along a bolt axis BA parallel to the axis of rotation DA. The short-stroke cylinder 47 can be fastened rigidly to the laser processing head and, in particular, does not move with the carriage 42.

For as long as the bolt 46 is retracted from the fork 45, the motor 43 may be used to displace the carriage 42, and hence also the frame 6, along the z-direction in order to change the position of the focal spot of the laser beam 5 on the workpiece, without this affecting the rotational position of the frame 6.

When the bolt 46 is inserted into the fork 45, a linear movement of the carriage 42—and hence also of the swivel shaft 41, on which the fork 45 is fastened—may generate a rotation of the swivel shaft 41. By way of example, if the carriage 42 is driven downward in the rotational position of the frame 6 or the fork 45 shown in FIG. 4, the bolt 46 not moving with the carriage 42 forces a rotation of the swivel shaft 41, together with the fork 45, in the counterclockwise direction. In the process, the bolt 46 is displaced relative to the fork 45 along the fork 45. FIG. 7 shows the laser processing head of FIG. 4 after the carriage 42 was displaced downward in the z-direction with the bolt 46 inserted into the fork 45, as a result of which the fork 45 (and hence also the swivel shaft and the frame 6) rotated through 90°.

The carriage 42 may initially need to be displaced into a z-position in which the fork 45 lies opposite the bolt 46 in order to insert the bolt 46 into the fork 45, i.e. to prepare a lens interchange.

As is visible best in FIG. 4 and FIG. 7, two abutment elements 48, 49 are further embodied at the rear end of the swivel shaft 41, the abutment elements defining and fixing end positions of the swivel shaft 41. In the rotational position shown in FIG. 4, the abutment element 48 abuts on a stop 50 of the carriage 42. The abutment element 48 is magnetic and, as a result thereof, acts as a fixation means 52 in relation to the ferromagnetic (or likewise magnetic) stop 50. The abutment element 49, which is likewise magnetic and may therefore likewise serve as a fixation means 53, may abut and hold the ferromagnetic (or likewise magnetic) stop 51 of the carriage 42 after swiveling the swivel shaft 41, as shown in FIG. 7. The two rotational positions of the swivel shaft 41 defined by the stops 50, 51 lie apart by 90°, corresponding to the angle between the optical axes OA1, OA2 of the collimating lenses 2 and 9.

The selection of the lens on the frame 6 (i.e. the rotational position of the swivel shaft 41) and the z-position of the employed lens (i.e. the displacement position in respect of the z-direction of the carriage 42) may be carried out by a machine controller, for example by way of stored parameter tables, without being influenced by an operator, and so a fitting scale ratio and a fitting focal position of the laser beam 5 are automatically selected and set when a workpiece to be processed (e.g., a sheet) is selected.

Figure 8:
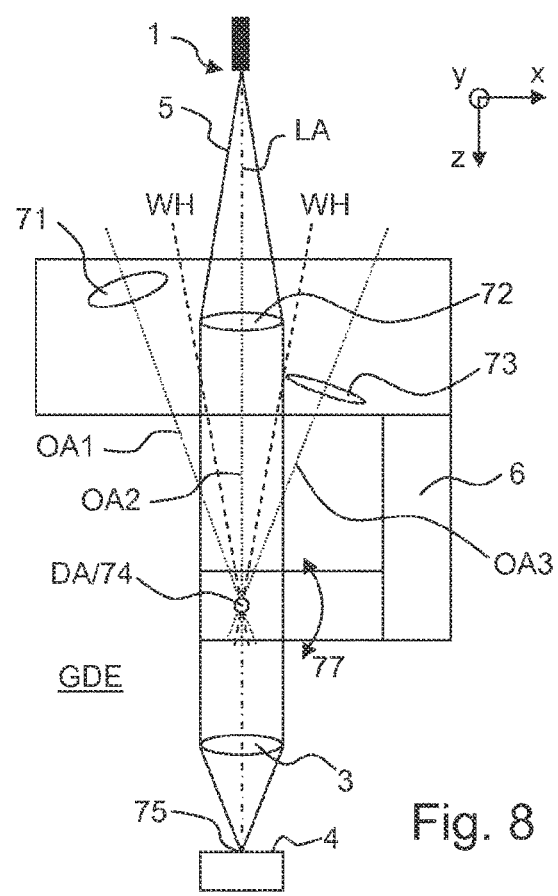
FIG. 8 shows a schematic overview of the optical system of a laser processing head according to the invention comprising three lenses, with a common crossing point of the optical axes.

FIG. 8 schematically illustrates the optical system of an embodiment of a laser processing head according to the invention, wherein three collimating lenses 71, 72, and 73 are held in an approximately C-shaped frame 6 in this case. The optical axes OA1, OA2, OA3 of these three collimating lenses 71, 72, and 73 lie in a plane, namely the common plane of rotation GDE, which lies perpendicular to an axis of rotation DA of the frame 6. The axis of rotation DA intersects the common crossing point 74 of the three optical axes OA1, OA2, OA3. All angle bisectors WH between respectively two optical axes OA1, OA2, and OA3 also extend through the common crossing point 74.

By swiveling the frame 6 about the axis of rotation DA, cf. arrow direction 77, each one of the lenses 71, 72, and 73, with the optical axis OA1, OA2, and OA3, respectively, may be brought into correspondence with the laser beam axis LA of the laser beam 5, which emanates from the laser light source 1. In the rotational position shown in FIG. 7, the middle collimating lens 72 is illustrated as being in use. In order to use the left lens 71, the frame is swiveled by approximately 20° in a clockwise direction. In order to use the right collimating lens 73, the frame 6 is swiveled by approximately 20° in the counterclockwise direction. The lenses 71, 72, and 73 all have different focal lengths and accordingly have a different distance from the axis of rotation DA along the respective optical axis OA1, OA2, and OA3.

The laser beam 5 collimated by one of the collimating lenses 71, 72, and 73 is focused on a workpiece 4 by the convex lens 3; in the shown embodiment, the focal spot 75 of the laser beam 5 lies at the surface of the workpiece 4.

Figure 9:
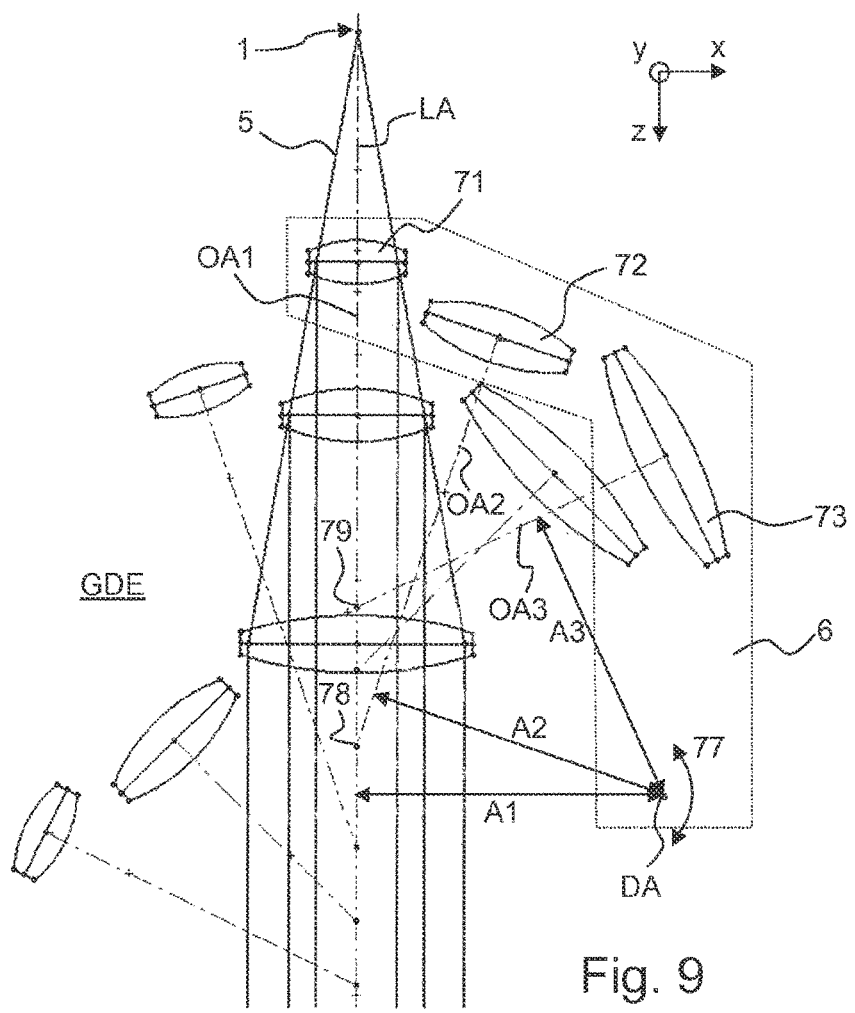
FIG. 9 shows a schematic overview of the optical system of a laser processing head according to the invention comprising three lenses, with pairwise crossing optical axes.

FIG. 9 illustrates the optical system of a further laser processing head according to the invention, in the region of the collimation optical unit.

Three collimating lenses 71, 72, and 73 are once again arranged on a frame 6, which is angled in this case. The frame 6 is swivelable about an axis of rotation DA. In this case, the axis of rotation DA does not lie on the angle bisectors of respectively two optical axes of the lenses 71, 72, and 73, but the axis of rotation DA is positioned in such a way that the distances A1, A2 and A3 of the optical axes OA1, OA2, OA3 from the axis of rotation DA are of equal magnitude, in each case measured in the common plane of rotation GDE, in which the optical axes OA1, OA2, OA3 lie, and perpendicular to the respective optical axis OA1, OA2, OA3.

In the embodiment illustrated in FIG. 9, the optical axes OA1, OA2, OA3 only cross in a pairwise manner. By way of example, the optical axes OA1 and OA2 cross at a crossing point 78, and the optical axes OA1 and OA3 cross at a crossing point 79, which is at a distance from the crossing point 78.

By swiveling the frame 6, as indicated by arrow direction 77, each one of the lenses 71, 72, and 73 may be swiveled into the beam path of the laser beam 5 such that the respective optical axis OA1, OA2, and OA3 coincides with the laser beam axis LA. In FIG. 9, the swiveled positions of the lenses 71, 72, and 73 (without the frame 6) are additionally plotted in each case. The lenses 71, 72, and 73 reach into the beam path of the laser beam 5 at different positions in z-direction in each case such that the laser light source 1 is in each case spaced apart from the respective lens 71, 72, and 73 in accordance with the focal length of this lens 71, 72, and 73.

A number of embodiments of the invention have been described. Nevertheless, it will be understood that various modifications may be made without departing from the spirit and scope of the invention. Accordingly, other embodiments are within the scope of the following claims.

What is claimed is:

1. A laser processing head with a lens interchange system comprising:
   a frame swivelable about an axis of rotation; and
   two lenses with different focal lengths, each lens attached to the frame, wherein the lens interchange system is configured to selectively bring each of the two lenses into a beam path of a laser beam in the laser processing head, wherein the axis of rotation extends perpendicular to a direction of a laser beam axis of the laser beam and perpendicular to a plane of rotation that comprises optical axes of the two lenses, wherein the optical axes of both lenses cross at a crossing point, wherein the optical axes of the two lenses are each spaced at an equal distance from the axis of rotation in the plane of rotation, and wherein the frame and the axis of rotation are configured in such a way that the two lenses are swiveled into the beam path of the laser beam at swiveled-in positions offset by a distance along the laser beam axis, wherein the distance corresponds to the difference in the focal lengths of the two lenses.

2. The laser processing head of claim 1, wherein the axis of rotation intersects an angle bisector between the optical axes of the two lenses.

3. The laser processing head of claim 1, wherein the lens planes of the two lenses intersect in a straight vertex line such that the axis of rotation is parallel to the straight vertex line and at a distance from the straight vertex line.

4. The laser processing head of claim 1, wherein the axis of rotation extends through the crossing point.

5. The laser processing head of claim 1, wherein the optical axes of the two lenses intersect at right angles.

6. The laser processing head of claim 1, wherein the two lenses of the lens interchange system are collimating lenses of the laser processing head.

7. The laser processing head of claim 6, wherein the collimating lenses are characterized by different focal lengths and, in the direction of the laser beam axis, the swiveled-in position of a first lens with shortest focal length is closer to a laser light source of the laser processing head than the swiveled-in position of a second lens with longest focal length.

8. The laser processing head of claim 1, wherein the lens interchange system forms two stops for two rotational positions of the frame, in which, in each case, one of the two lenses is swiveled into the beam path of the laser beam, and wherein fixation means are provided, the fixation means being configured to fix the frame in both rotational positions.

9. The laser processing head of claim 1, wherein the focal lengths of the two lenses are configured such that a laser light source of the laser processing head is projected in a magnified manner.

10. The laser processing head of claim 1, wherein the frame is arranged on a carriage, in relation to which the frame is mounted to be rotatable about the axis of rotation, wherein the carriage is displaceable in a motor-driven manner in the direction of the laser beam axis.

11. The laser processing head of claim 10, wherein at least one of a fork and a slot is embodied in or fastened to the frame, and is configured for engagement with a bolt, which is not displaceable with the carriage.

12. The laser processing head of claim 11, wherein, a distance between the positions of the two lenses swiveled into the beam path of the laser beam, plus an associated travelling distance of the carriage for swiveling the frame by means of the fork or the slot, corresponds to the difference of the focal lengths of the two lenses.

13. The laser processing head of claim 11, wherein the bolt is embodied such that it may be inserted into, or retracted from, the fork or the slot in a motor-driven manner.

* * * * *